United States Patent
Overdevest et al.

(10) Patent No.: US 12,436,233 B2
(45) Date of Patent: Oct. 7, 2025

(54) RADAR INTERFERENCE DETECTION

(71) Applicant: NXP B.V., Eindhoven (NL)

(72) Inventors: Jeroen Overdevest, Eindhoven (NL); Francesco Laghezza, Eindhoven (NL)

(73) Assignee: NXP B.V., Eindhoven (NL)

( * ) Notice: Subject to any disclaimer, the term of this patent is extended or adjusted under 35 U.S.C. 154(b) by 391 days.

(21) Appl. No.: 18/081,169

(22) Filed: Dec. 14, 2022

(65) Prior Publication Data

US 2023/0251348 A1    Aug. 10, 2023

(30) Foreign Application Priority Data

Feb. 9, 2022   (EP) .................................. 22155994

(51) Int. Cl.
    *G01S 7/35*    (2006.01)
    *G01S 7/02*    (2006.01)

(52) U.S. Cl.
    CPC .............. *G01S 7/354* (2013.01); *G01S 7/023* (2013.01)

(58) Field of Classification Search
    CPC ...... G01S 13/931; G01S 7/023; G01S 7/2883; G01S 7/2922; G01S 7/354; H04B 1/1027
    See application file for complete search history.

(56) References Cited

U.S. PATENT DOCUMENTS

| | | | |
|---|---|---|---|
| 11,353,549 B2 | 6/2022 | Jansen et al. | |
| 11,525,885 B2* | 12/2022 | Ygnace | G01S 7/354 |
| 2018/0011180 A1 | 1/2018 | Warnick et al. | |
| 2021/0072372 A1 | 3/2021 | Mlinar | |
| 2022/0404455 A1* | 12/2022 | Liu | G01S 13/931 |

OTHER PUBLICATIONS

Kabakchiev, C., "Improvement in SNR of Signal Detection using Filtering in Pulsar-Based Navigation Systems", 2017 18th International Radar Symposium (IRS), German Institute of Navigation—DGON, Jun. 28, 2017.

* cited by examiner

*Primary Examiner* — Timothy A Brainard

(57) ABSTRACT

A data processing device and method for detecting interference in FMCW radar signals, configured to use an adaptive thresholding technique to identify interference in a plurality of samples forming a beat signal, the adaptive thresholding including grouping the plurality of samples into a plurality of subsets, determining a maximum magnitude of each subset and extracting an nth lowest maximum magnitude of the plurality of subsets to determine an adaptive threshold, and applying the adaptive threshold to each sample to generate a mask.

19 Claims, 13 Drawing Sheets

RADAR INTERFERENCE DETECTION

BACKGROUND

The present specification relates to detecting interference in frequency modulated continuous wave (FMCW) radar systems.

A variety of different radar techniques are known generally and radar can be used in a wide variety of applications. One particular application of radar systems is to vehicles and in particular in relation to vehicle safety systems and/or autonomous vehicles.

As the number of vehicles equipped with radar systems is increasing and likely to proliferate further, a particular challenge for radar systems in the automotive area is the potential for radar-to-radar interference. Frequency modulated continuous wave (FMCW) radar systems are commonly used in automotive radar systems as the frequency modulation waveform (also called a chirp) is a particularly suitable waveform for automotive radar systems owing to its accuracy and robustness. Implementations in which a sequence of short duration frequency chirps are transmitted has favourable properties with respect to the detection of objects moving with a non-zero relative radial velocity.

Undesired signals from other radar or communications systems that use the frequency spectrum around the instantaneous frequency of the radar while sampling can be seen as interference. The interference will be down converted to the receiver bandwidth and processed in the same way as the desired signal reflected from a target.

Interference scenarios can happen when two radars (victim and interferer) that are in a common visible path (e.g., line of sight (LOS) and/or reflection and/or diffraction) somehow access the medium using similar carrier frequency and bandwidth at the same time. FMCW interference can be created by correlated and uncorrelated FM sources. Correlated FM sources can create false targets while uncorrelated FM sources (which are the more likely case), can cause reduced dynamic range and sensor blindness.

FMCW-to-FMCW interference levels and occurrences can vary from application to application and from radar configuration to radar configuration. For example, medium range radar (MRR) and short range radar (SRR) can suffer more from the interference problem owing to their larger RF excursion, field of view (FOV) and deployment.

When dealing with FMCW interference, different options and strategies can be considered at the radar system level. Detection of interference should ideally occur as soon as possible and preferably before Range Doppler processing and the occurrence of detected interference, as well as its energy, can be passed to higher radar system layers.

Following detection of interference in a radar system, and the identification of the interference signals, appropriate interference avoidance and/or mitigation strategies can be employed. Hence, improved interference detection techniques may lead to improved mitigation and/or avoidance mechanisms.

SUMMARY

Aspects of the present disclosure are set out in the accompanying independent and dependent claims. Combinations of features from the dependent claims may be combined with features of the independent claims as appropriate and not merely as explicitly set out in the claims.

According to a first aspect of the present disclosure, there is provided a data processing device for detecting interference in frequency modulated continuous wave, FMCW, radar signals received by a radar receiver of a radar system, wherein the data processing device is configured to obtain a plurality of samples forming a beat signal, determine a magnitude of each sample, group the plurality of samples into a plurality of subsets wherein each subset corresponds to a given time segment of the beat signal, determine a maximum magnitude of each subset, extract an $n^{th}$ lowest maximum magnitude of the plurality of subsets to determine an adaptive threshold, and apply the adaptive threshold to each sample of the plurality of the samples to generate a mask. If the magnitude of a sample is higher than the adaptive threshold the mask has a first value for that sample and if the magnitude of the sample is lower than the adaptive threshold the mask has a second value for that sample, wherein the first value is indicative of a sample comprising interference and the second value is indicative of a sample without interference.

The adaptive thresholding technique of the present disclosure advantageously takes into account the time-limited wideband structure of FMCW-to-FMCW interference (in the case of uncorrelated interference). Thus, the adaptive thresholding technique assumes that the interference is time-limited and not present in every sample.

The mask may be referred to as a binary mask. Optionally, the first value may be 0 and the second value may be 1.

A sample comprising interference may be referred to as an interfered sample. A sample without interference may be referred to as a clean sample, or an interference-free sample.

As would be appreciated by the skilled person, the magnitude of a sample is the absolute amplitude of the sample. This may also be referred to as the modulus of the sample. In some embodiments, the data processing device may be configured to determine the magnitude squared of each sample.

The data processing device may be further configured to multiply the extracted $n^{th}$ lowest maximum magnitude by an upscaling factor to determine the adaptive threshold. The upscaling factor may be an adjustable design parameter. Optionally, the upscaling factor has a value between 1 and 2.

Optionally, with regards to the $n^{th}$ lowest maximum magnitude, n may be an integer less than or equal to 10.

Optionally, the $n^{th}$ lowest maximum magnitude may be the $3^{rd}$ lowest maximum magnitude, or the $2^{nd}$ lowest maximum magnitude, or the lowest maximum magnitude of the plurality of subsets.

Thus, prior to grouping the plurality of samples into the plurality of subsets, the data processing device is configured to determine the modulus of each sample. Each sample corresponds to an absolute amplitude of the beat signal at a given time.

Prior to grouping the plurality of samples into the plurality of subsets, the data processing device may be configured to apply a high-pass filter to each sample of the plurality of samples, and then determine the modulus of each high-pass filtered sample. The type of high-pass filter used, and the process of applying the high-pass filter, may be as described in European patent publication number EP3620810 A1, which is incorporated herein by reference.

High-pass filtering is beneficial as it can remove discernible signals which might have arisen from a reflector so that the remaining discernible signals are likely to be interference and noise. The high-pass filter may lead to a suppression of several dB's in the lower frequency components of the beat signal.

Optionally, the data processor may be configured to generate a first mask as described above using the modulus samples (i.e., magnitude of each sample) and generate a second mask as described above using the modulus high-pass filtered samples (i.e., magnitude of the high-pass filtered samples). The data processor may multiply the first mask and the second mask together to provide a combined mask.

In other words, the plurality of samples forming the beat signal may be processed twice, along two 'paths' through the data processor. Along the first 'path' the data processor uses the modulus of the samples, and along the second 'path' the data processor uses the modulus of the high-pass filtered samples.

It may be advantageous to use the combined mask, as the first mask generated using the modulus samples can be better at detecting low-frequency interference, as the low-frequency components of each sample are suppressed by the high-pass filter used in the generation of the second mask. In addition, the second mask generated using the modulus of the high-pass filtered samples can be better at detecting low amplitude or weak interference, such as out-of-band interference caused by aliasing in higher-frequency samples. Thus, the combined mask can provide improved overall detection of interference compared to the single mask approach.

Optionally, the data processing device may be further configured to apply a moving average filter followed by a fixed threshold to the mask. Optionally, the data processing device may be further configured to apply a moving average filter followed by a fixed threshold to at least one of the first mask and the second mask, prior to generating the combined mask.

After the thresholding stage, there might be samples that are mis-detected, either as false positives or false negatives, which can lead to spikes in the mask. The moving average filter converts the binary mask into a non-binary mask. The fixed threshold converts the non-binary mask back to a modified binary mask. For example, the fixed threshold may be selected such that a given number of consecutive samples need to have the second value in order for the modified binary mask to have the second value.

Optionally, the moving average filter may be a Finite Impulse Response (FIR) filter.

The data processing device may be configured to apply the mask, or the combined mask, to the beat signal to mitigate or remove any samples detected as comprising interference (i.e. having the first value in the mask or combined mask).

Thus, the data processing device may multiply the beat signal (or the plurality of samples) by the mask, or the combined mask, to reduce or remove any samples that have the first value in the mask, or the combined mask.

Optionally, another possible mitigation technique is that the "desired" beat signal can be reconstructed for the samples that have the first value in the mask.

Optionally, the data processing device may be further configured to determine the number of first values in the mask, or in the combined mask. In response to determining that the number of first values exceeds a predetermined limit, the data processing device may be configured to set an interference flag.

Whilst the data processing device is configured to detect or identify interference present in the beat signal, interference mitigation or avoidance action may be handled by another component of the radar system.

The data processing device may be configured to pass the interference flags to another component of the radar system configured to take interference avoidance and/or mitigation action.

The data processing device may be configured to output or communicate data identifying each sample determined to comprise interference to an avoidance and/or mitigation process within the radar system.

The data processing device may be configured to repeat the process described above for a plurality of beat signals (i.e., for a plurality of subsequent chirps of the radar system).

The data processing device may be configured to generate a plurality of masks or a plurality of combined masks, each mask or combined mask associated with a respective beat signal. The data processing device may be configured to aggregate the plurality of masks or the plurality of combined masks to form a first one-dimensional vector and a second one-dimensional vector, wherein each variable in the first one-dimensional vector is a summation of the number of first values in the plurality of masks or the plurality of combined masks in the time dimension, and wherein each variable in the second one-dimensional vector is a summation of the number of first values in the plurality of masks or the plurality of combined masks in the frequency dimension. The time dimension may be referred to as slow-time, defined by the chirp number. The frequency dimension may be referred to as fast-time, defined by the sample number.

In may be advantageous to store the plurality of masks or combined masks as two one-dimensional vectors rather than as two-dimensional masks, as this takes up less memory space. This may be particularly beneficial in automotive radar applications, as memory usage is often constrained.

The data processing device may be further configured to set an interference flag if a variable in either the first one-dimensional vector or the second one-dimensional vector exceeds a predetermined limit.

A second aspect of the present disclosure provides a package including an integrated circuit, wherein the integrated circuit is configured to provide the data processing device as described above in any preceding embodiment or example of the first aspect of the disclosure.

A third aspect of the present disclosure provides a frequency modulated continuous wave, FMCW, radar system including the data processing device as described above in any preceding embodiment or example of the first aspect of the disclosure, or the package as described above in the second aspect of the disclosure.

A fourth aspect of the present disclosure provides a method of detecting interference in a frequency modulated continuous wave, FMCW, radar system, the method comprising obtaining a plurality of samples forming a beat signal, determining the magnitude of each sample, grouping the plurality of samples into a plurality of subsets, wherein each subset corresponds to a given time segment of the beat signal, determining a maximum magnitude of each subset, extracting an $n^{th}$ lowest maximum magnitude of the plurality of subsets to determine an adaptive threshold, applying the adaptive threshold to each sample of the plurality of samples to generate a mask, wherein if the magnitude of a sample is higher than the adaptive threshold the mask has a first value for that sample and if the magnitude of the sample is lower than the adaptive threshold the mask has a second value for that sample, wherein the first value is indicative of a sample comprising interference and the second value is indicative of a sample without interference.

The method of the fourth aspect of the present disclosure may also comprise any feature described in the first aspect of the disclosure. In other words, any method step carried out by the data processing device or other component of the radar system may form part of the fourth aspect of the disclosure. Equivalently, features of the first aspect may also be or give rise to counterpart features for the fourth aspect of the disclosure.

BRIEF DESCRIPTION OF THE DRAWINGS

Embodiments of this disclosure will be described hereinafter, by way of example only, with reference to the accompanying drawings in which like reference signs relate to like elements and in which.

DETAILED DESCRIPTION

Embodiments of this disclosure are described in the following with reference to the accompanying drawings.

Figure 1:
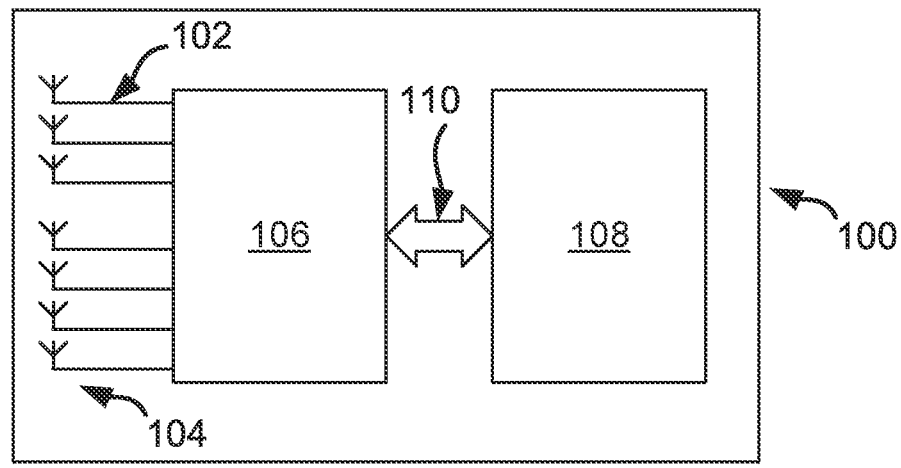
FIG. 1 shows a schematic block diagram of a radar system that can be configured to use the interference detection technique according to the present disclosure.

With reference to FIG. 1 there is shown a schematic block diagram of a radar system 100 in which the interference detection technique of the present disclosure may be used. In the described embodiment, the radar system is an automotive radar system, but the technique is not necessarily limited to that application. The radar system 100 includes a plurality of transmitting antennas 102 and a plurality of receiving antennas 104 connected to a radar sensor module 106. The radar sensor module 106 is connected to other higher level parts 108 of the overall radar system 100 by a radar system bus 110. The exact structure of the overall radar system 100 is incidental and the interference detection technique can be used in a wide range of radar systems and is not limited to the specific radar system 100 illustrated in FIG. 1.

Various features of the radar system may be varied as it will be apparent to a person of ordinary skill in the art. For example, the number of transmitting and receiving antennas can be more or fewer and various functions can be distributed differently between the radar sensor module 106 and the remainder of the radar system 108. Also, some functionalities may be implemented in dedicated hardware and others in software and others in combinations of hardware and software. In one embodiment, the sensor module 106 may be provided in the form of an integrated circuit in a package.

Figure 2:
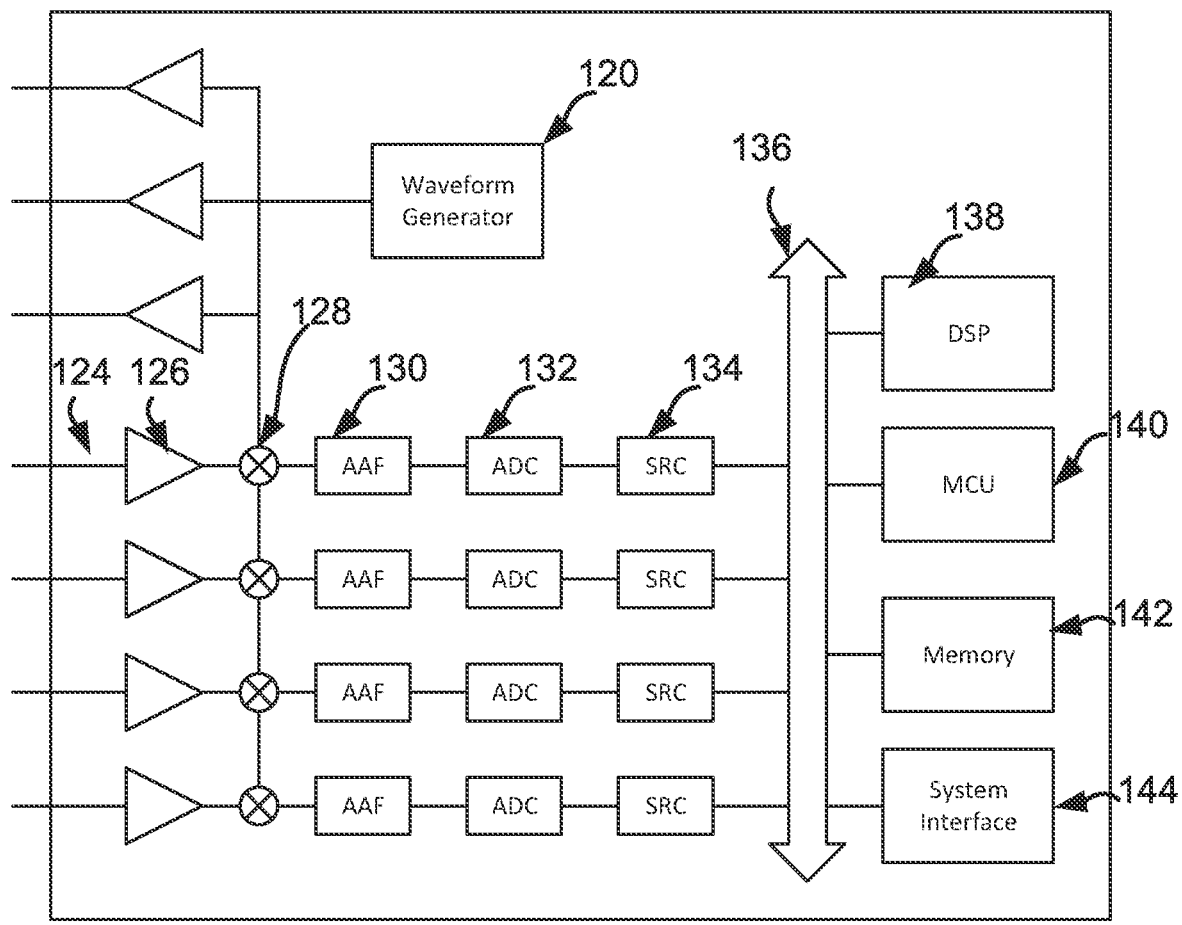
FIG. 2 shows a schematic block diagram of a radar sensor module of the radar system in FIG. 1.

FIG. 2 shows a schematic block diagram of the radar sensor module 106 of FIG. 1 in greater detail. The radar sensor module includes a waveform generator 120 configured to generate radar cycles each comprising a sequence of multiple chirp signals and having an output connected to respective inputs of a power amplifier 122 for each of three transmitter chains, for example. The respective outputs of the power amplifiers 122 are each connected to a respective one of the transmission antennas 102. Four receiver channels 124, for example, are also provided, a respective one of which is connected to a respective one of the receiver antennas 104. Each receiver channel 124 generally includes a low noise amplifier 126, a mixer 128, to which the output of the waveform generator 120 is also connected, an anti-aliasing filter (AAF) 130, an analogue to digital converter (ADC) 132 and a sample rate conversion (SRC) device 134. The output of each receiver chain is connected to a bus system 136 to which a digital signal processor (DSP) 138, a microcontroller unit (MCU) 140, a memory 142 and a system interface 144 are each connected. DSP 138 is used to implement various data processing operations as described below, MCU is used to generally control operation of the sensor module 106 and also to carry out various higher level data processing operations, memory 142 provides local data storage for the DSP 138, MCU 140 and sensor module 106 generally and system interface 144 provides an interface to the remainder of the radar system 108 via system bus 110.

The overall method of operation of the FMCW radar system 100 will initially be described with reference to provide context for the description of the interference detection technique. The overall method of operation of FMCW radar systems, without the interference detection technique, is generally understood by a person of ordinary skill in the art and various details will be omitted from the following for the sake of brevity and to avoid obscuring the description of the interference detection technique.

Figure 3:
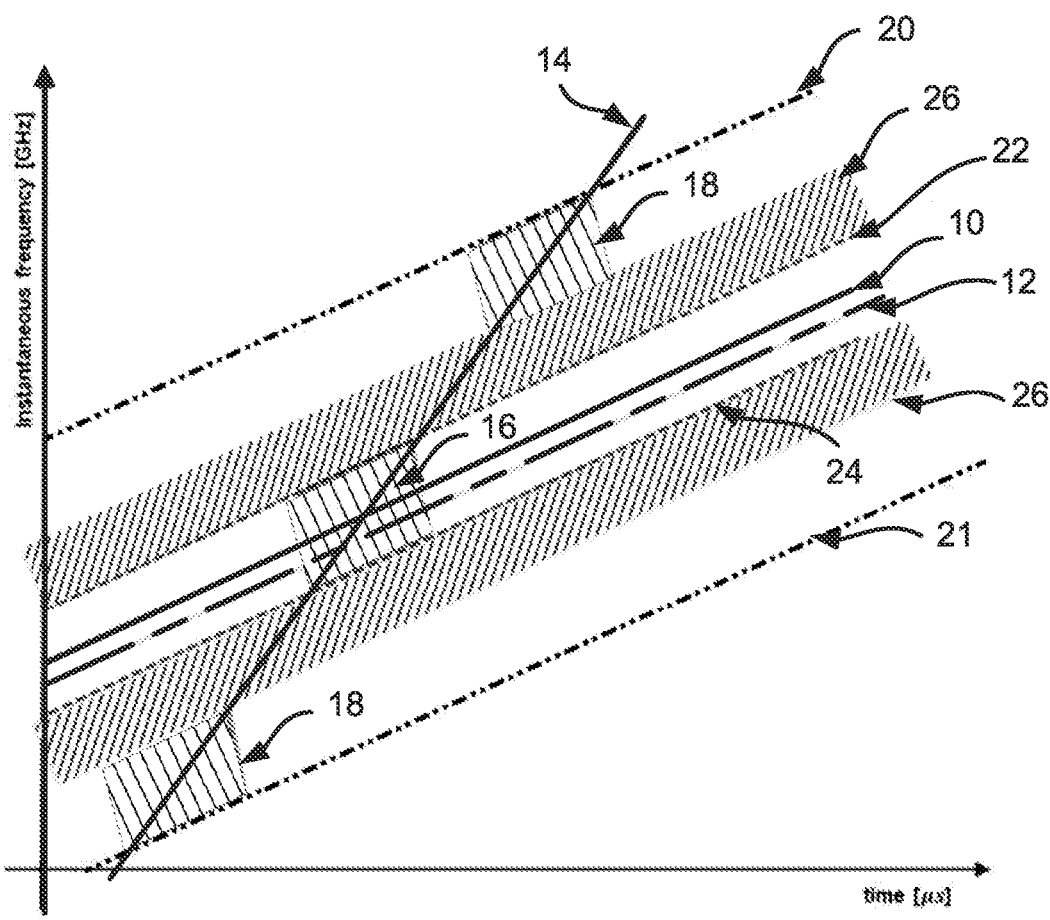
FIG. 3 shows a plot of frequency against time illustrating the general principle of operation of the FMCW radar system.

FIG. 3 shows a plot of carrier frequency against time illustrating the general principle of operation of the FMCW radar system 100 prior to down-mixing and radar-to-radar interference. The radar system 100 is configured to transmit a sequence of chirps 10 via the transmitting antennas 102, wherein FIG. 3 shows a single chirp 10 for simplicity. The receiving antennas 104 are configured to receive a reflected chirp 12 from a target, called the received chirp signal 12, after a delay time equal to the time of flight.

However, as shown in FIG. 3, there is also an interfering chirp 14 of another FMCW radar system. If a radar signal, such as interfering chirp 14, from another radar system is in the field of view of the radar system 100 this causes interference, specifically radar-to-radar interference, which can disrupt the function of the radar system 100.

The anti-aliasing filters (AAF) 130 in the receiver channels have an upper aliasing low pass filter boundary 20 and a lower aliasing low pass filter boundary 21, as shown in FIG. 3. The interfering chirp 14 results in 'in-band' interference 16 where the interfering chirp 14 intersects the transmitted chirp 10 between an upper sample rate conversion (SRC) bound 22 and a lower SRC bound 24. The interfering chirp 14 results in 'out-of-band' interference 18 between the upper aliasing low pass filter boundary 20 and a suppression of digital decimation filter band 26, and between the lower aliasing low pass filter boundary 21 and a suppression of digital decimation filter band 26.

Figure 4:
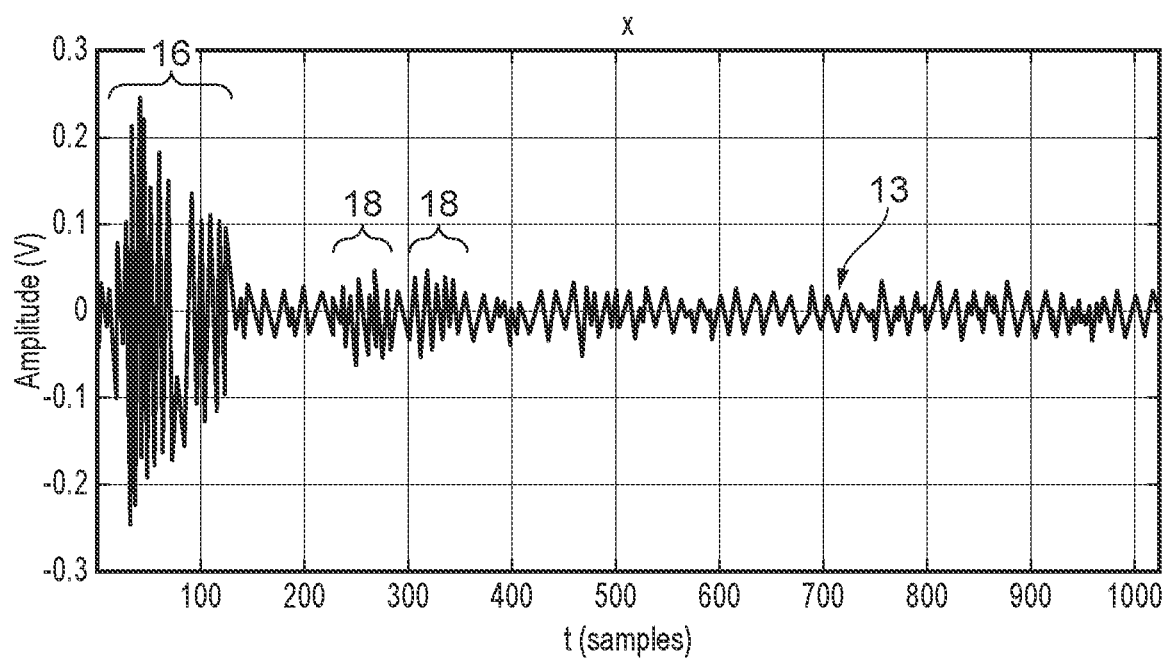
FIG. 4 is an example of a beat signal resulting from the radar signals shown in FIG. 3 illustrating the radar-to-radar interference.

The in-band interference 16 and, to a lesser extent, the out-of-band interference 18 corrupts the beat signal, as shown in FIG. 4, and can cause degradation in the normal functioning of the radar system if not addressed.

The receiver channels 124 are configured to, after low noise amplification, down convert (or down-mix) the received chirp signal 12 by mixing the transmitted chirp 10 and received chirp 12 signals to create a beat signal 13. Assuming that there is no interference, the result of this down conversion operation is a sine wave oscillating at a frequency called the beat frequency ($F_{beat}$). The beat frequency depends on the distance to the reflecting object, D, the difference between the start and the stop frequency of the ramp $\Delta F$, and the duration of the ramp $T_{ramp}$ as follows:

$$F_{beat} = \Delta F / T_{ramp} \times 2D/c$$

where c is the speed of light.

FIG. 4 shows an example of a beat signal 13 resulting from down-mixing the transmitted chirp 10 and the received chirp 12 signals shown in FIG. 3. The beat signal 13 is formed of a plurality of digital samples or fast-time samples, hereafter called samples, output from the receiver channels 124. In FIG. 4 the x-axis is the sample number, which is a measure of time as the $1^{st}$ sample is received at the earliest time and the $N^{th}$ sample is received at the latest time, and the y-axis is amplitude measured in volts (V) (as the ADC 132 outputs amplitude in volts).

As shown, the beat signal 13 comprises in-band interference 16 and out-of-band interference 18 which disrupt the expected fixed-amplitude sine wave of the beat signal 13. Detection of the in-band and out-of-band interference components is crucial for restoring the receiver channels 124 noise floor, such that the radar's maximum detectable distance, at which targets can be detected at, stays intact. Thus, the present disclosure provides an improved method for detecting these interference components in the beat signal.

Figure 5:
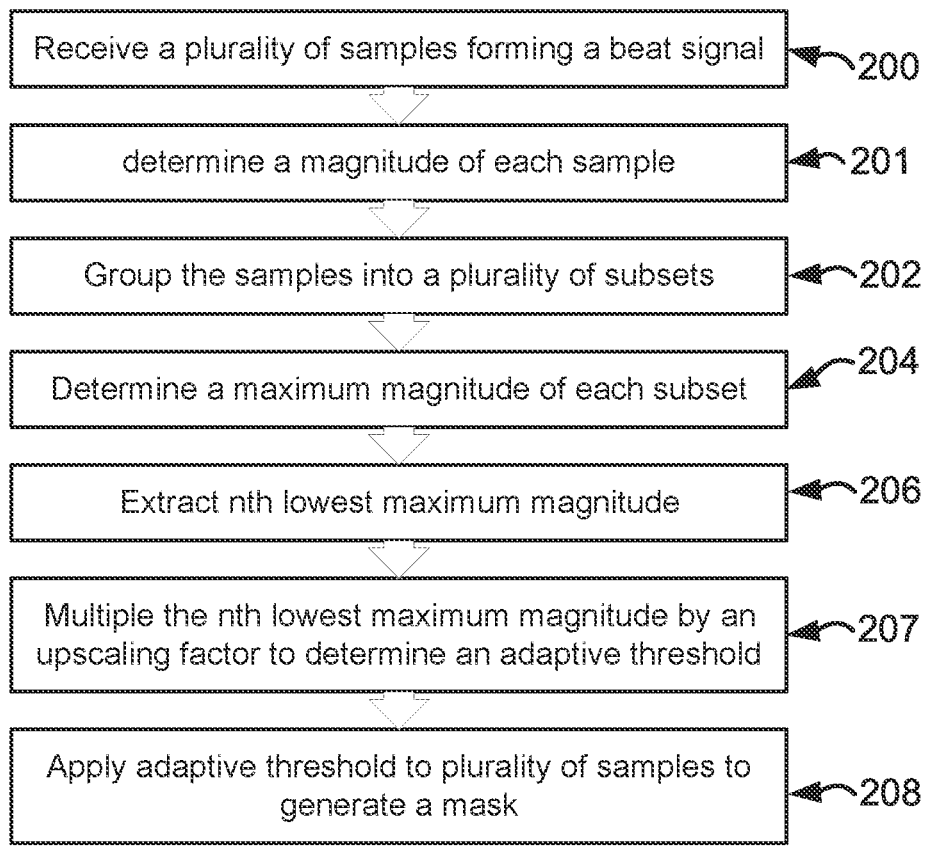
FIG. 5 is a flowchart illustrating a method of detecting interference according to an embodiment of this disclosure.

A flowchart illustrating a method configured to be carried out by a data processing device according to an embodiment of the present disclosure is shown in FIG. 5. The data processing device may form part of the radar sensor module 106. In step 200 the data processing device receives a plurality of samples forming a beat signal. For example, the beat signal, $x_m$, where the subscript m refers to the $m^{th}$ chirp, may be formed of N samples.

In step 201 the data processing device determines the magnitude or modulus of the plurality of samples, wherein the magnitude of each sample is the absolute amplitude (i.e., no negative amplitude). Method steps 202 onwards use the modulus of the samples, $|x_m|$, rather than the original samples. This simplifies the data processing for the adaptive thresholding (particularly step 208), as there are no negative amplitudes to consider, so the data processing device does not need to take into account the sign (i.e., + or −) of the amplitude.

Step 202 is the start of the adaptive thresholding technique according to the present disclosure. In step 202, the plurality of samples (i.e. the plurality of modulus samples) are grouped (also known as split, divided or separated) into a plurality of subsets, such that each subset corresponds to a given time segment of the beat signal. Thus, each subset comprises adjacent samples (in terms of time and carrier frequency) rather than the samples being randomly distributed across the subsets.

For example, the N samples forming the beat signal $x_m$ may be grouped into K subsets, such that each subset comprises N/K samples, wherein N and K are both a power of 2, as shown below:

$$x_m = [x_{m,1}\ x_{m,2}\ x_{m,3}\ \ldots\ x_{m,K}] \text{ where} \quad -(1)$$

$$x_{m,1} = x_m\left(1, 2, \ldots, \frac{N}{K}\right), x_{m,2} = x_m\left(\frac{N}{K}+1, \frac{N}{K}+2, \ldots, \frac{2N}{K}\right),$$

$$\ldots, x_{m,K} = x_m\left(\frac{(K-1)N}{K}+1, \frac{(K-1)N}{K}+2, \ldots, N\right),$$

An advantage of the thresholding technique of the present invention is that it takes into account the time-limited, wideband structure of the FMCW-to-FMCW interference (in case of uncorrelated interference). In other words, the assumption is taken that the interference is time-limited and, therefore, not present in all samples.

At step 204, the maximum magnitude of each subset is determined. At step 206, the $n^{th}$ lowest of the maximum magnitude of the plurality of subsets is extracted or identified. Optionally, n may be an integer less than or equal to 10. In some embodiments, in step 206 the $n^{th}$ lowest of the maximum magnitudes is the lowest maximum magnitude, or the $2^{nd}$ lowest maximum magnitude, or the $3^{rd}$ lowest maximum magnitude or the $4^{th}$ lowest maximum magnitude of the plurality of subsets. The $n^{th}$ lowest maximum magnitude is then used to determine an adaptive threshold. The adaptive threshold according to the present disclosure therefore scales with the maximum beat signal present, such that a strong beat signal can never be classified as interference.

In step 207 the extracted $n^{th}$ lowest maximum magnitude of the plurality of subsets is multiplied by an upscaling factor to determine the adaptive threshold. The upscaling factor is a parameter that may be set or optimized by the user (or the data processing device). In some embodiments, the upscaling factor has a value between 1 and 2. In one non-limiting embodiment the upscaling factor is 1.5. It will be appreciated that this is an optional step. In some embodiments the $n^{th}$ lowest maximum magnitude may be equal to the adaptive threshold (i.e., there is no upscaling factor, or the upscaling factor is equal to 1).

An equation representing the adaptive threshold ($T_{A,m}$) for the $m^{th}$ chirp is shown below in equation 2:

$$T_{A,m} = \xi \cdot \min\{[\max\{x_{m,1}\}, \max\{x_{m,2}\}, \max\{x_{m,3}\}, \ldots, \max\{x_{m,K}\}]\} \quad (2)$$

Figure 8:
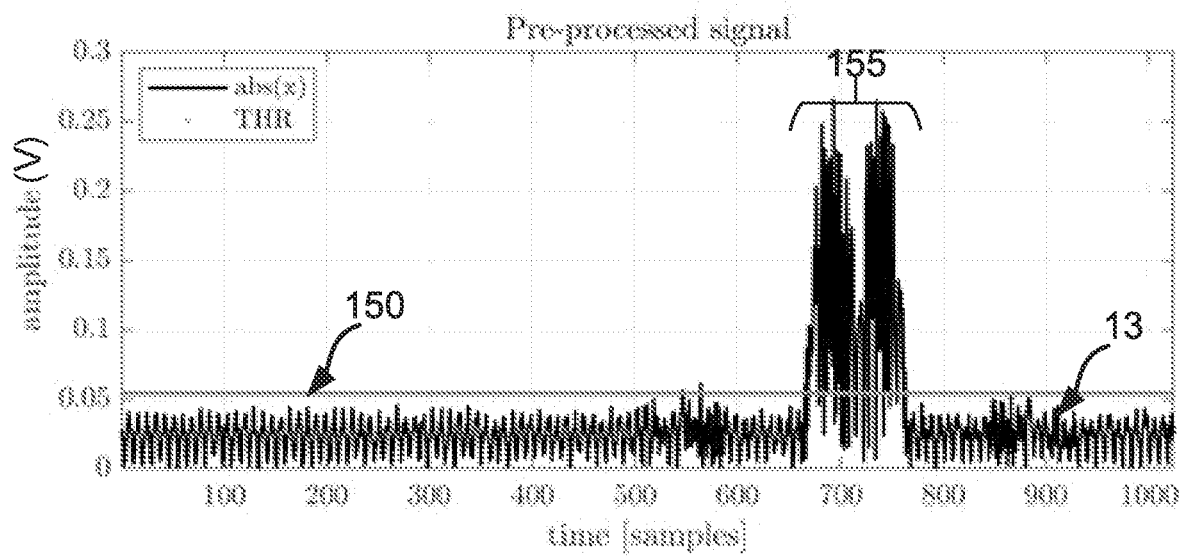
FIG. 8 illustrates an adaptive threshold determined according to the present disclosure applied to the modulus of the beat signal.

At step 208, the data processing device is configured to apply the adaptive threshold (determined in step 206) to each of the plurality of samples, or in other words to the beat signal $x_m$, to generate a mask. An example of an adaptive threshold 150 according to the present disclosure is shown in FIG. 8 overlaid on the modulus of the plurality of samples forming the beat signal ($|x_m|$)13. In FIG. 8, the number of samples N=1024, the number of subsets K=64 and the upscaling factor=1.5. The x-axis in FIG. 8 is the sample number (i.e., from 1 to 1024) which is a measure of time, and the y-axis is amplitude measured in volts.

If a sample has a magnitude that is higher than the adaptive threshold 150, the mask has a first value for that sample. If a sample has a magnitude that is lower than the adaptive threshold 150, the mask has a second value for that sample. The first value indicates that the sample comprises interference and the second value indicates that the sample does not comprise interference (i.e., the sample is clean). Thus, the mask may be a binary mask. Optionally, the first value may be 0 and the second value may be 1, but it will be appreciated that the present disclosure is not limited to these values.

Accordingly, the mask generated in step 208 indicates which samples have been detected to comprise interference. The mask may be forwarded to another component of the radar system 100 to take appropriate avoidance or mitigation action based on the detected interference.

It will be appreciated that the method in FIG. 5 is shown for a single chirp (a single beat signal) and can be repeated for a plurality of chirps, such that a plurality of masks are generated.

Optionally, the data processing device (or another component of the radar system 100) may be configured to negate or null the detected interference by multiplying the beat signal by the mask. For example, if the first value is equal to 0 this will set the amplitude of all samples detected as comprising interference to 0.

In some embodiments, the data processing device may be configured to determine the total number of first values in the mask. If this total number of first values exceeds a predetermined limit an interference flag may be set. This interference flag may be output to another component in the radar system and may trigger an appropriate avoidance and/or mitigation action. Optionally, the interference flag may be called an interference avoidance flag, or an interference mitigation flag.

Figure 6:
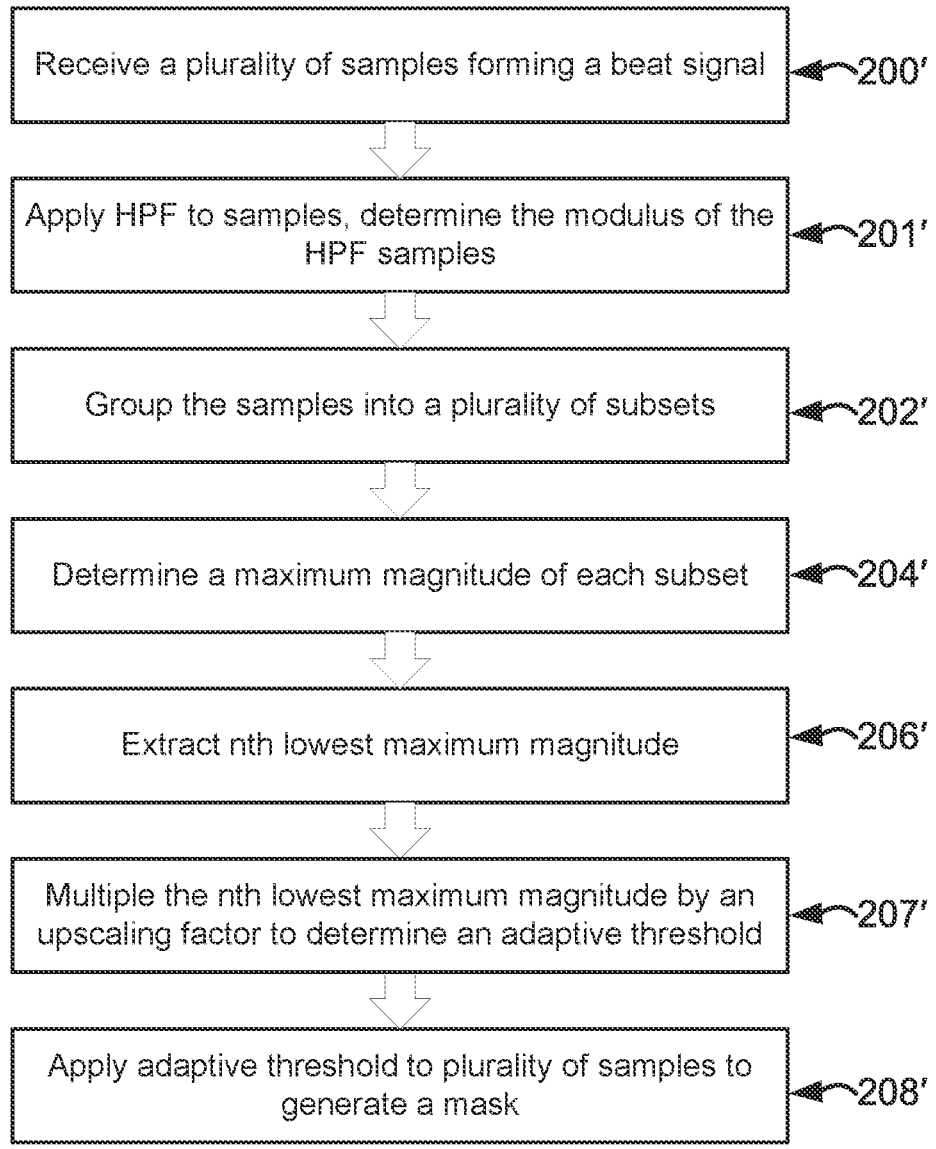
FIG. 6 is a flowchart illustrating a method of detecting interference according to an embodiment of this disclosure.

A flowchart illustrating another method configured to be carried out by a data processing device according to an embodiment of the present disclosure is shown in FIG. 6. Steps which are common between FIG. 6 and FIG. 5 have been numbered accordingly. In FIG. 6, in step 201' after receiving the plurality of samples forming the beat signal the digital processing device is configured to apply a high-pass filter (HPF) to each sample, and to determine the magnitude or modulus of each high-pass filtered sample (|HPF(x)|). The high-pass filter may be as described in European patent publication EP3620810.

High-pass filtering is beneficial as it removes (or reduces) discernible signals which might have arisen from a reflector (i.e., the wanted signal components), so that the remaining discernible signals are much more likely to be interference and noise (i.e., the unwanted signal components). The high-pass filter generally leads to a suppression of several dB's in the lower frequency components of the beat signal.

The thresholding stage (i.e., steps 202' to 208') may then proceed as defined in connection with FIG. 5, with the exception that the samples used are the modulus high-pass filtered samples (|HPF(x)|).

Figure 7:
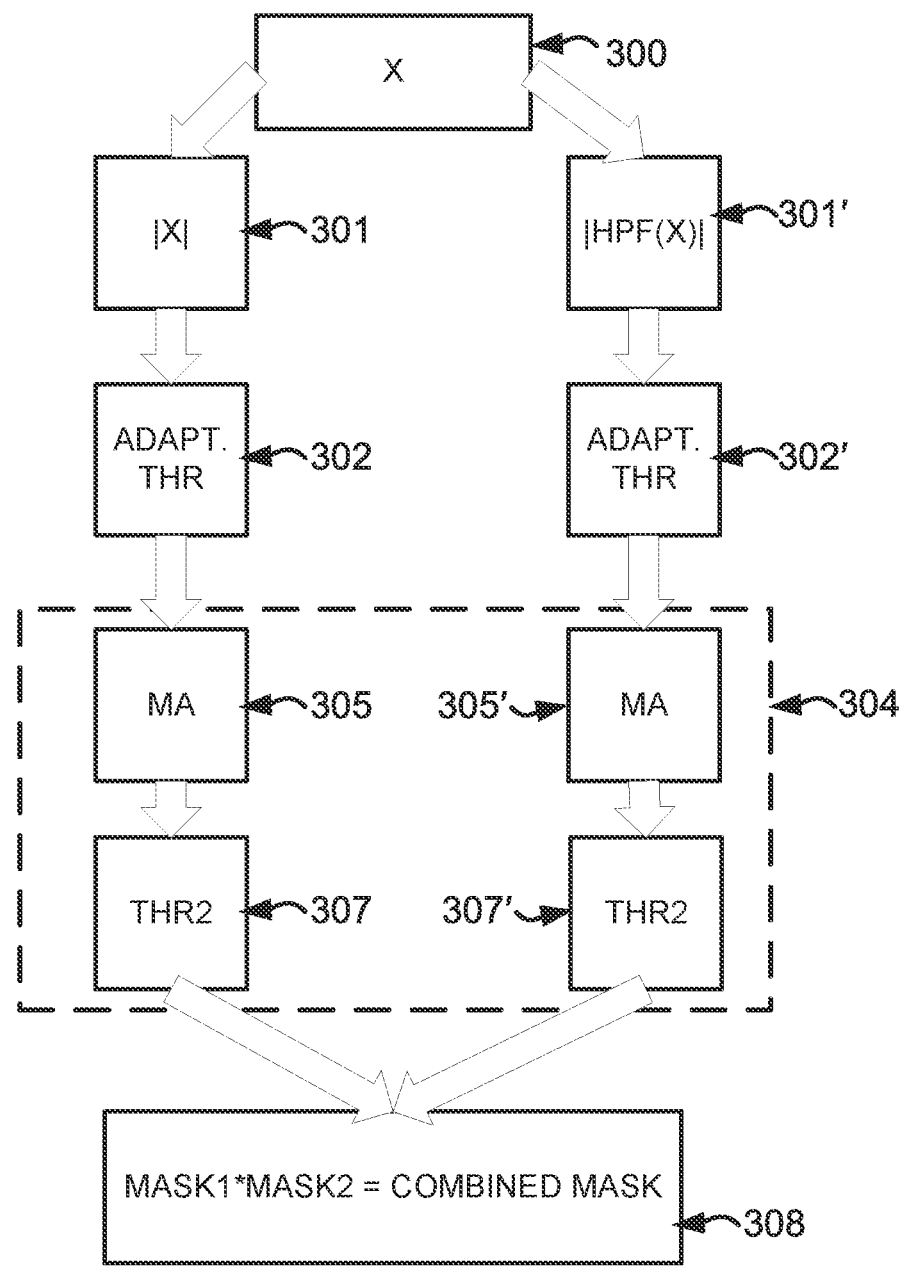
FIG. 7 is a block diagram illustrating an interference detection method executed by a data processing device according to an embodiment of this disclosure.

FIG. 7 is a block diagram illustrating a two-path process (or algorithm) according to an embodiment of the present disclosure. At block 300 the plurality of samples forming a beat signal $x_m$ are received. The processing of the plurality of samples then logically splits into a first path and a second path. Each path may proceed according to the methods described in FIG. 5 or FIG. 6.

A first path comprises block 301 wherein the modulus (or magnitude) of the plurality of samples is determined. At block 302 the adaptive thresholding technique of the present disclosure is carried out using the modulus of the samples to generate a first adaptive threshold and a first mask, wherein the adaptive thresholding is as described in steps 202 to 208 of FIG. 5.

A second path comprises block 301' wherein a high-pass filter is applied to the plurality of samples and the modulus (or magnitude) of the high-pass filtered samples is determined. At block 302' the adaptive thresholding technique of the present disclosure is carried out using the modulus of the high-pass filtered samples to generate a second adaptive threshold and a second mask, wherein the adaptive thresholding is as described in steps 202' to 208' of FIG. 6.

As described above, if one of the modulus samples has a magnitude that is higher than the first adaptive threshold determined at block 302, the first mask has a first value for that sample. If one of the modulus samples has a magnitude that is lower than the first adaptive threshold determined at block 302, the first mask has a second value for that sample. The first value indicates that the sample comprises interference and the second value indicates that the sample does not comprise interference (i.e., the sample is clean). However, this can lead to samples being mis-detected, either falsely identified as containing interference, or falsely identified as not containing interference. This results in spikes in the mask (i.e., the first mask and the second mask) as shown in FIG. 9.

Figure 9:
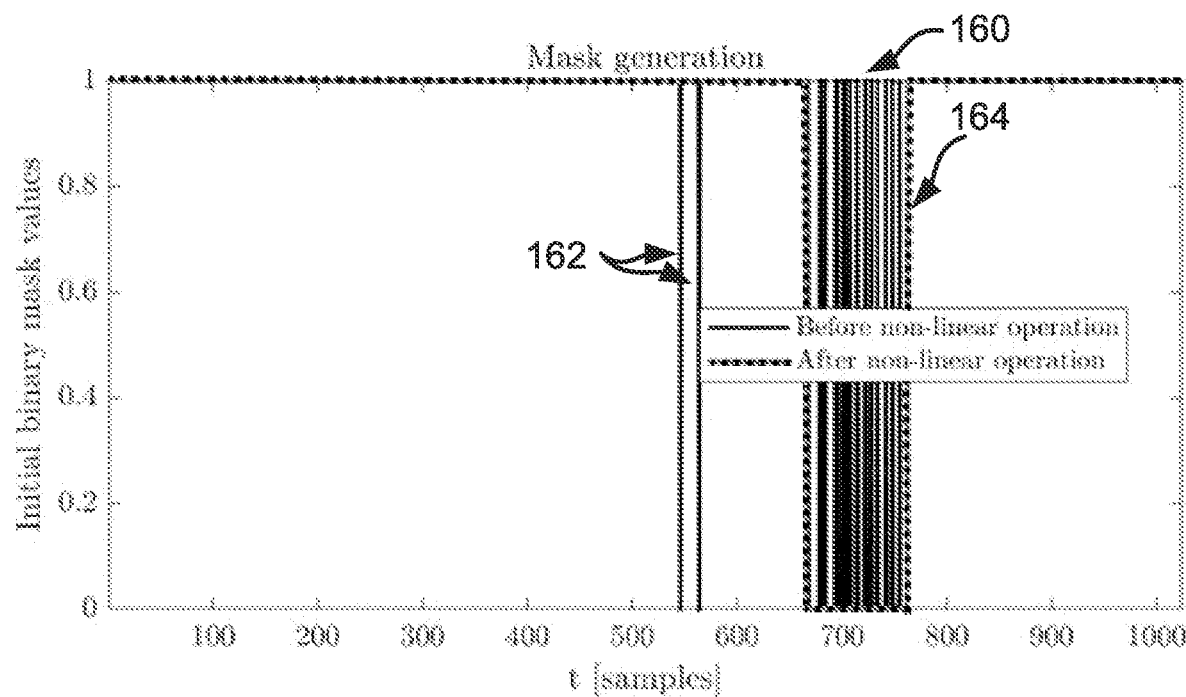
FIG. 9 is a plot showing a mask according to the present disclosure both before and after applying a moving average filter and a fixed threshold.

In FIG. 9, the solid lines are the mask 160 which is generated by applying the adaptive threshold 150 in FIG. 8 to the modulus of the plurality of samples 13. In this example, the first value of the mask indicative of interference is 0 and the second value indicative of no interference is 1. It will be appreciated that mask 160 may be a first mask resulting from the first path of the two-path process in FIG. 7, or it may be generated following the method in FIG. 5. As shown in FIG. 8, between sample number 500 and sample number 600 there are two samples having magnitudes that are slightly above the adaptive threshold. As such, the mask 160 has the first value (0) for these two samples, which correspond to the spikes 162 in the mask 160 in FIG. 9.

It would be beneficial to remove spikes 162 from the mask 160, thereby correcting any mis-detected samples and smoothing out the mask. This can be done by a filtering process represented by section 304 in FIG. 7. The filtering process 304 may also be referred to as a non-linear process.

A first step of the filtering process 304 is applying a moving average (MA) filter to the initial mask. This is represented by blocks 305 and 305' in FIG. 7 for the first mask and the second mask respectively. The moving average filter may be a finite impulse response filter (FIR filter). The moving average filter converts the binary mask into a non-binary mask, as the mask no longer has only a first value and a second value. This smooths out the spikes 162 in FIG. 9.

A fixed threshold may then be applied to the non-binary mask, represented by blocks 307 and 307' in FIG. 7. The fixed threshold converts the filtered mask back to a binary mask, as a binary mask is required to clearly identify which samples are determined to comprise interference. For example, when a moving average filter of length 8 is used a fixed threshold of 0.625 would mean that 5 out of 8 consecutive samples should be 1 in order to get a 1 in the final mask. The final mask is illustrated by the dashed lines in FIG. 9. As shown, it is a smooth binary mask, wherein the samples identified as comprising interference are the samples in region 155 in FIG. 8.

Returning to the two-path process shown in FIG. 7, after the first mask and the second mask have been updated using the filtering process 304 described above, the masks are multiplied together to create a signal combined mask, as shown in block 308. The combined mask can provide improved overall detection of interference compared to the single mask approach, as demonstrated in FIGS. 10 to 19. In FIGS. 10 to 19 for the adaptive thresholding technique the $n^{th}$ lowest maximum magnitude of the plurality of subsets was taken to be the lowest maximum magnitude of the plurality of subsets.

Figure 10:
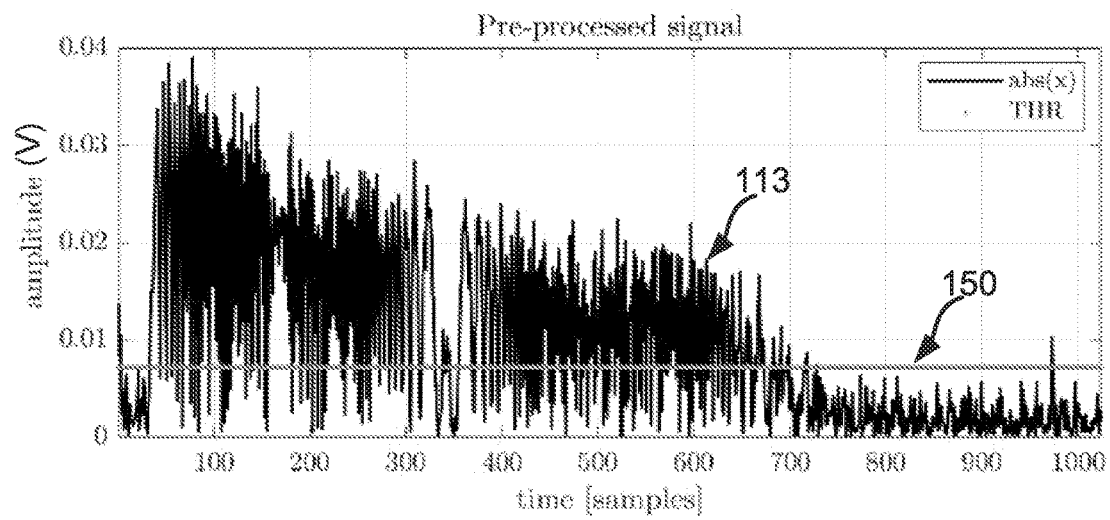
FIG. 10 is a plot showing an adaptive threshold determined according to the present disclosure applied to the modulus of a beat signal.
Figure 11:
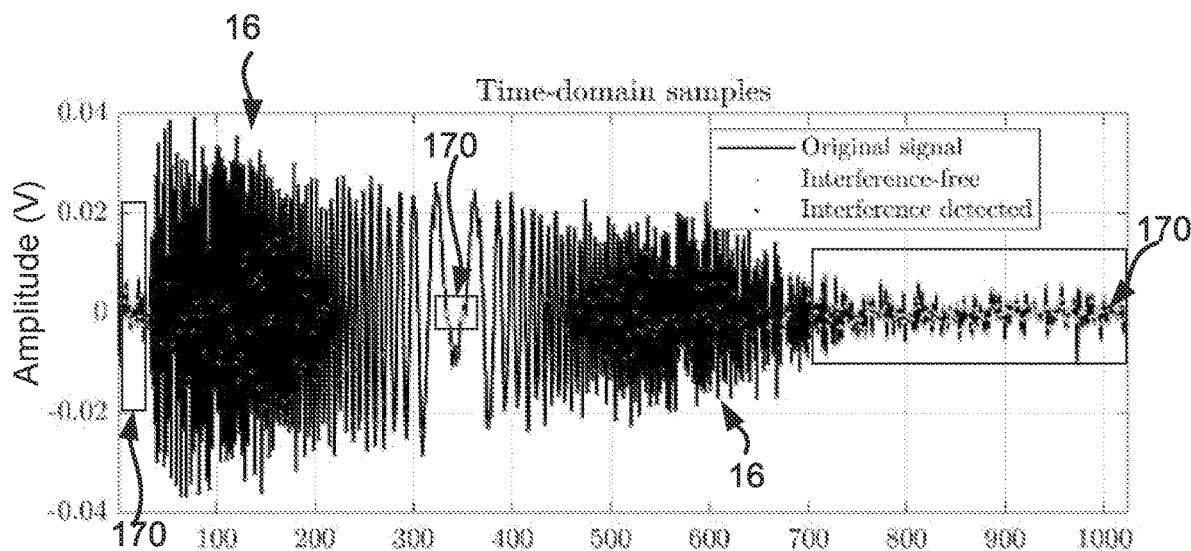
FIG. 11 is a plot showing the original beat signal in FIG. 10 wherein the adaptive threshold has been applied such that each sample is identified as either comprising interference or not comprising interference.

FIG. 10 shows the modulus of a beat signal (abs(x)) 113 and a first adaptive threshold 150 determined according to the method in FIG. 5 or the first path in FIG. 7. FIG. 11 shows the original beat signal (i.e., not the modulus) wherein the first adaptive threshold 150 has been applied. Samples having a magnitude that is lower than the first adaptive threshold 150 are identified as interference-free, shown by a lighter-grey marker. Samples having a magnitude that is higher than the first adaptive threshold 150 are identified as comprising interference, shown by a darker-grey marker. The main regions comprising the interference-free samples are labelled as 170 on FIG. 11, to improve clarity.

As shown in FIG. 11, there is only in-band interference present in this beat signal (see FIG. 3 for explanation). This is because the difference in the slope of the victim and interfering chirps is relatively small, so the interference may be considered to be semi-correlated.

Figure 12:
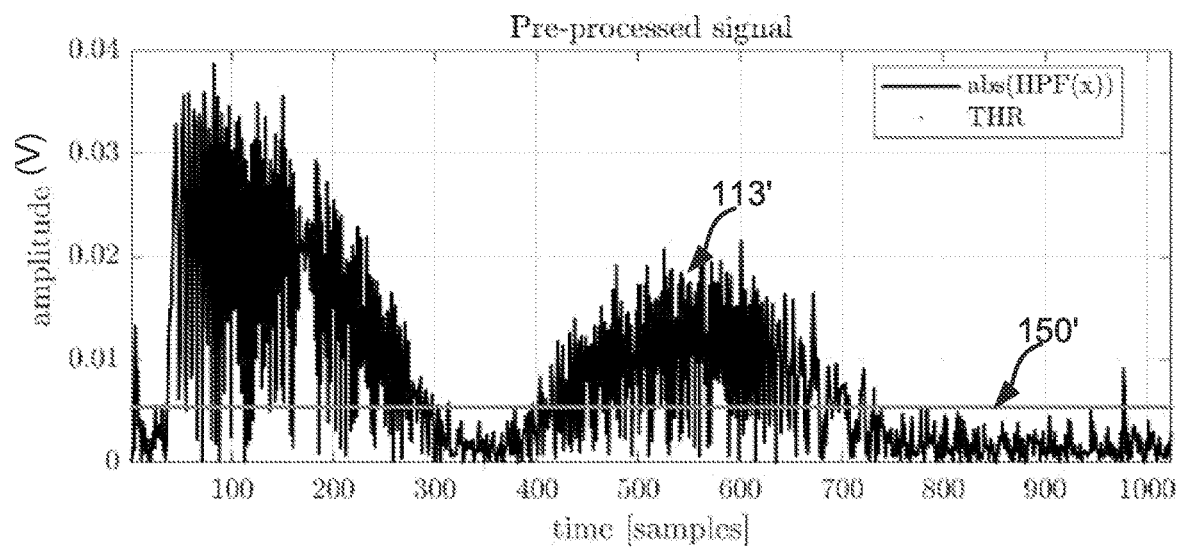
FIG. 12 is a plot showing an adaptive threshold determined according to the present disclosure applied to the modulus of the high-pass filtered beat signal, wherein the original beat signal is the same as in FIG. 11.

In FIG. 12, the beat signal corresponds to the original beat signal in FIG. 11 with a high-pass filter applied to each sample and the modulus taken (abs(HPF(x)). The modulus high-pass filtered beat signal is labeled as 113'. The second adaptive threshold 150' is overlaid on the modulus high-pass filtered beat signal 113', wherein the second adaptive threshold 150' is determined according to the method in FIG. 6 or the second path in FIG. 7.

Figure 13:
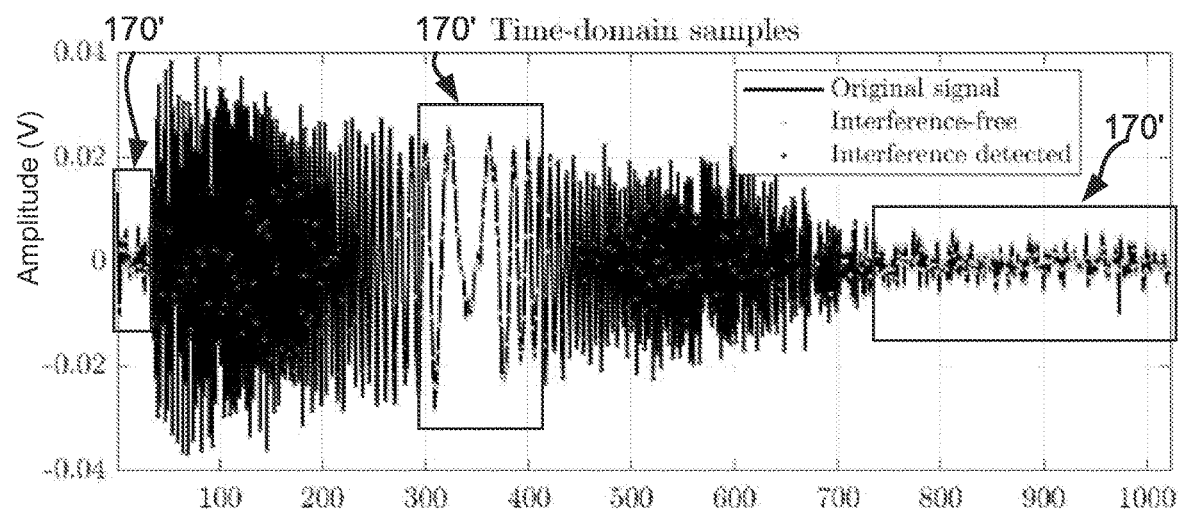
FIG. 13 is a plot showing the original beat signal in FIG. 11 wherein the adaptive threshold in FIG. 12 has been applied such that each sample is identified as either comprising interference or not comprising interference.

FIG. 13 shows the original beat signal (i.e., not the modulus) of FIG. 11 wherein the second adaptive threshold 150' has been applied. Samples having a magnitude that is lower than the second adaptive threshold 150' are identified as interference-free, shown by a lighter-grey marker. Samples having a magnitude that is higher than the second adaptive threshold 150' are identified as comprising interference, shown by a darker-grey marker. The main regions comprising the interference-free samples are labelled as 170' on FIG. 13, to improve clarity.

A comparison of FIGS. 11 and 13 shows that the interference-free region 170' in FIG. 13 between sample numbers 300 and 400 is much larger than the corresponding interference-free region 170 in FIG. 11. Thus, the first mask generated using the non-high-pass filtered modulus samples is better (or more accurate) at detecting low-frequency interference components, specifically in the region of samples 300-400. This is because in FIGS. 12 and 13 these low-frequency interference components are suppressed by the high-pass filter, which makes detection more difficult.

Figure 14:
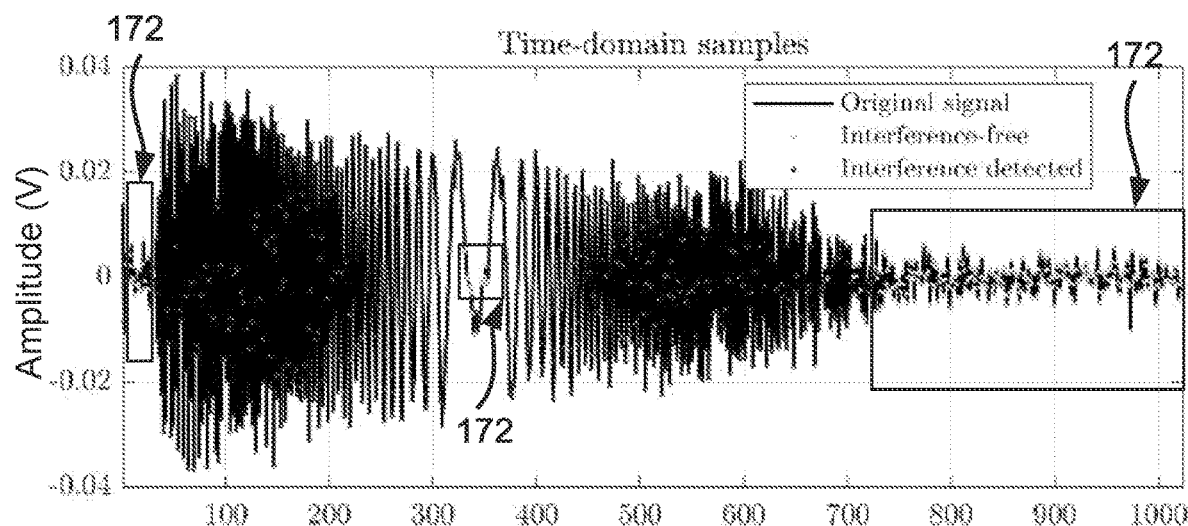
FIG. 14 is a plot showing the original beat signal in FIG. 11 with the combined mask applied.

FIG. 14 shows the combined detection outcome of the two-path process in FIG. 7. In other words, FIG. 14 illustrates the combined mask applied to the original beat signal, wherein the combined mask is obtained by multiplying the first mask (for |x|) resulting from FIG. 11 by the second mask (for |HPF(x)|) resulting from FIG. 13.

The regions comprising the interference-free samples are labelled as 172 on FIG. 14. As shown, using the combined mask the low-frequency interference between samples 300-400 is correctly detected, due to the first mask, and appropriate action can then be taken to suppress or mitigate this interference.

Figure 15:
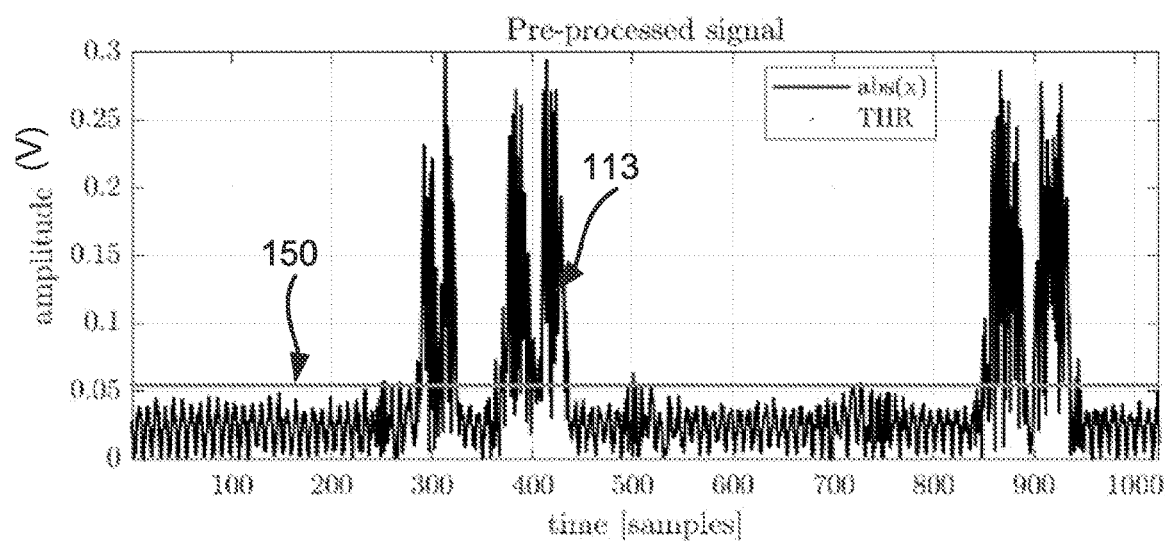
FIG. 15 shows an adaptive threshold determined according to the present disclosure applied to the modulus of another beat signal.

FIG. 15 shows the modulus (abs(x)) of a different beat signal 113, wherein the beat signal comprises two short uncorrelated interferers, along with a stronger target which hides the out-of-band frequency components. This is shown by the two distinct groups of peaks in FIG. 15. The first adaptive threshold 150 is again determined according to the method in FIG. 5 or the first path in FIG. 7.

Figure 16:
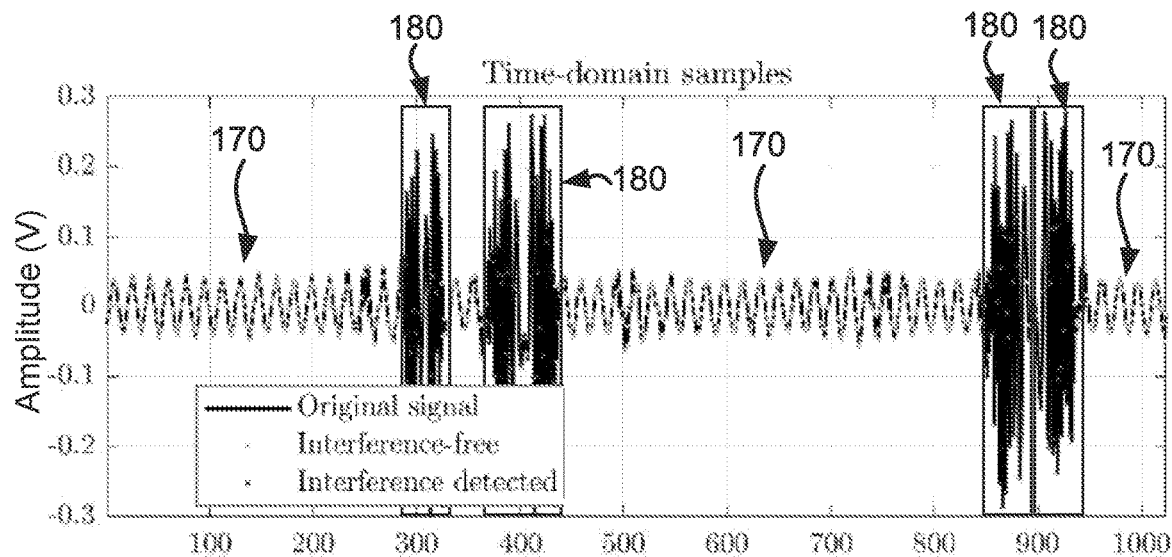
FIG. 16 a plot showing the original beat signal in FIG. 15 wherein the adaptive threshold has been applied such that each sample is identified as either comprising interference or not comprising interference.

FIG. 16 shows the original beat signal (i.e., not the modulus) from FIG. 15 wherein the first adaptive threshold 150 has been applied. Samples having a magnitude that is lower than the first adaptive threshold 150 are identified as interference-free, shown by a lighter-grey marker. Samples having a magnitude that is higher than the first adaptive threshold 150 are identified as comprising interference, shown by a darker-grey marker. The regions comprising the interference-free samples are labelled as 170 on FIG. 16 and the regions comprising interference are labeled as 180, to improve clarity.

Figure 17:
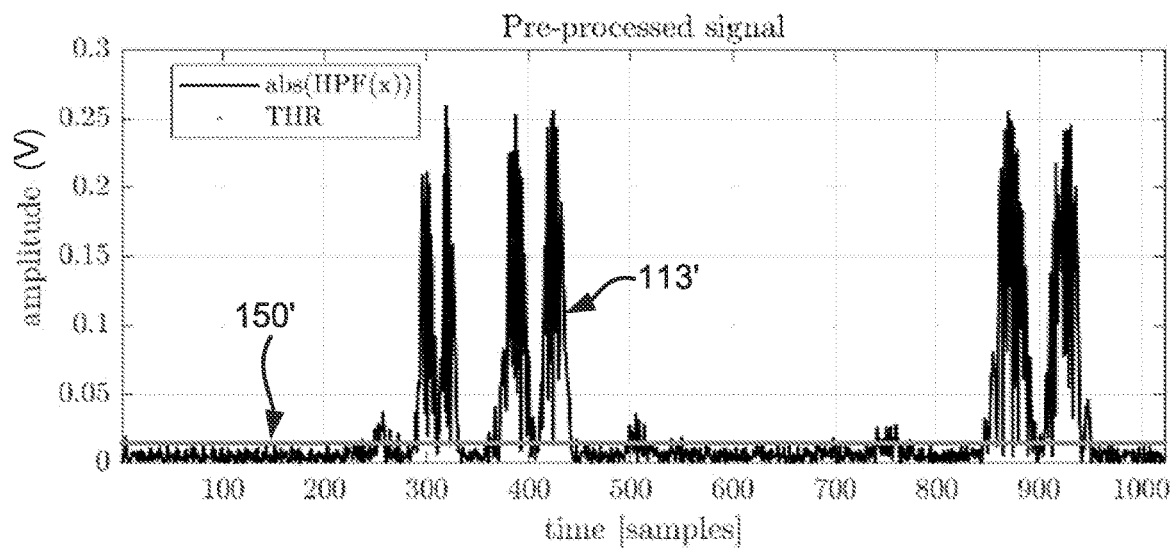
FIG. 17 is a plot showing another adaptive threshold determined according to the present disclosure applied to the modulus of the high-pass filtered beat signal, wherein the original beat signal is the same as in FIG. 16.
Figure 18:
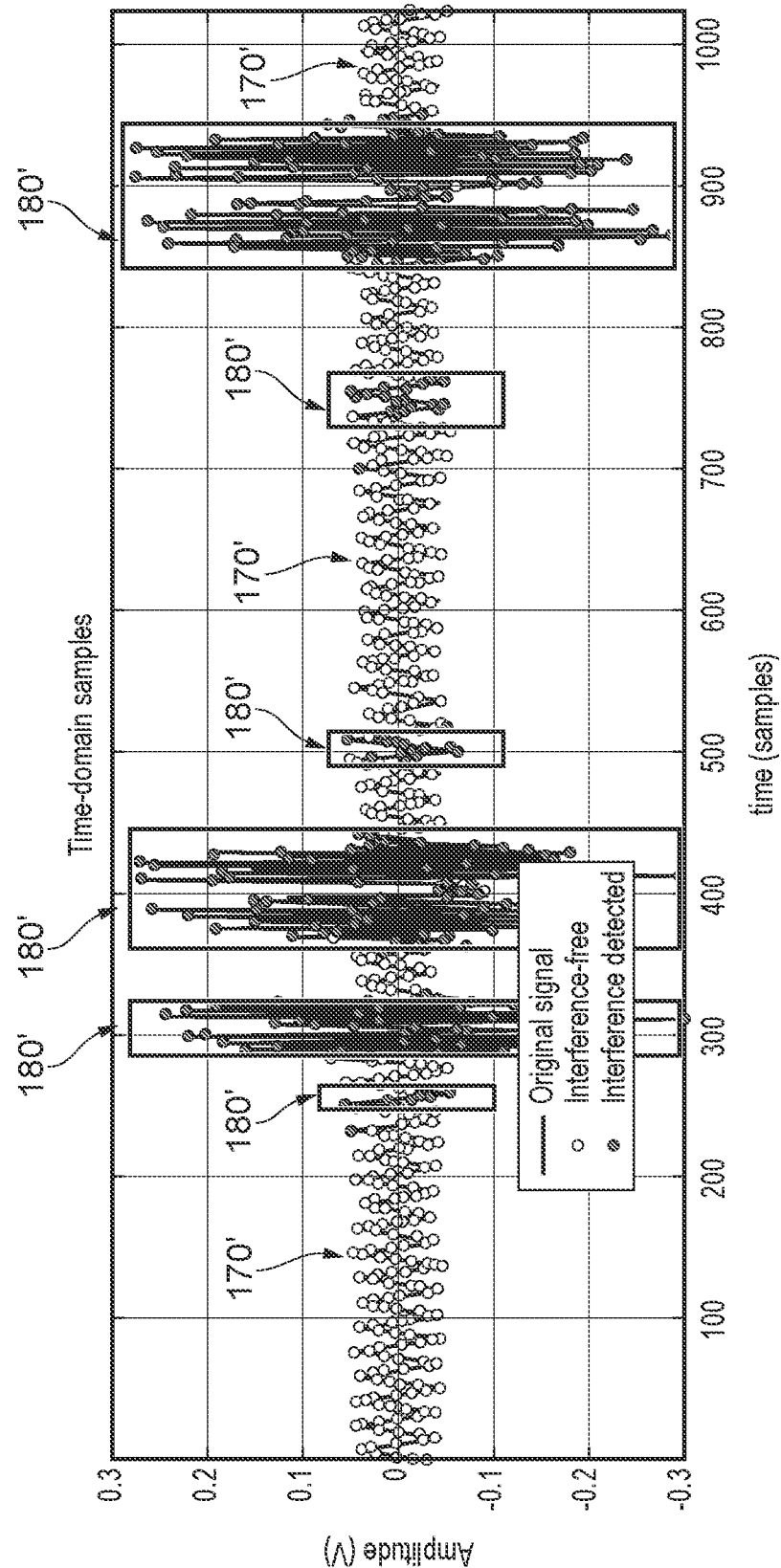
FIG. 18 is a plot showing the original beat signal of FIG. 16 with the adaptive threshold of FIG. 17 applied such that each sample is identified as either comprising interference or not comprising interference.

The interference regions 180 in FIG. 16 correspond to in-band interference from the two uncorrelated interferers. No out-of-band interference is detected, because the out-of-band interference components have an amplitude that is comparable to the beat signal. This allows some interference leakage in the higher-frequency components e.g., between sample numbers 500-800. As shown in FIGS. 17 and 18, this out-of-band interference can be detected using the high-pass filtered adaptive threshold path (i.e., path 2 in FIG. 7).

FIG. 17 shows the same beat signal as in FIG. 16, but with a high-pass filter applied and the modulus taken (abs(HPF (x)). The modulus high-pass filtered beat signal is labeled as 113'. The second adaptive threshold 150' is overlaid on the modulus high-pass filtered beat signal 113', wherein the second adaptive threshold 150' is determined according to the method in FIG. 6 or the second path in FIG. 7.

A comparison of FIGS. 17 and 15 shows that the second adaptive threshold 150' (about 0.013 V) is lower than the first adaptive threshold 150 (just above 0.05 V). This is because the high-pass filter attenuates the low frequency components of each sample, so the adaptive threshold is lower. Thus, as shown in FIG. 17, there are three smaller peaks that extend above the second adaptive threshold 150' centered at around sample number 250, sample number 500 and sample number 750 respectively. These smaller or secondary peaks correspond to the out-of-band interference that was not detected by the first detection path in FIGS. 15 and 16.

FIG. 18 shows the original beat signal (i.e., not the modulus) of FIG. 16 wherein the second adaptive threshold 150' has been applied. Samples having a magnitude that is lower than the second adaptive threshold 150' are identified as interference-free, shown by a lighter-grey marker. Samples having a magnitude that is higher than the second adaptive threshold 150' are identified as comprising interference, shown by a darker-grey marker. The regions comprising the interference-free samples are labelled as 170' on FIG. 18 and the regions comprising interference are labeled as 180', to improve clarity.

As shown, the high-pass filtered detection path can detect the lower magnitude interference components that are hidden in the beat signal. This is because the high-pass filter suppresses the strong target signal (i.e., the lower frequency components of each sample), which results in a lower adaptive threshold that can detect the lower magnitude interference.

Thus, the high-pass filtered detection path (e.g. the second path in FIG. 7) is especially relevant in presence of very strong, close by targets when interference can be buried in the desired beat signal. This can lead to an inevitable interference-induced noise floor increase when not detected, in the case where the non-high-pass filtered path (e.g., first |x| path in FIG. 7) is not able to detect the interference.

Figure 19:
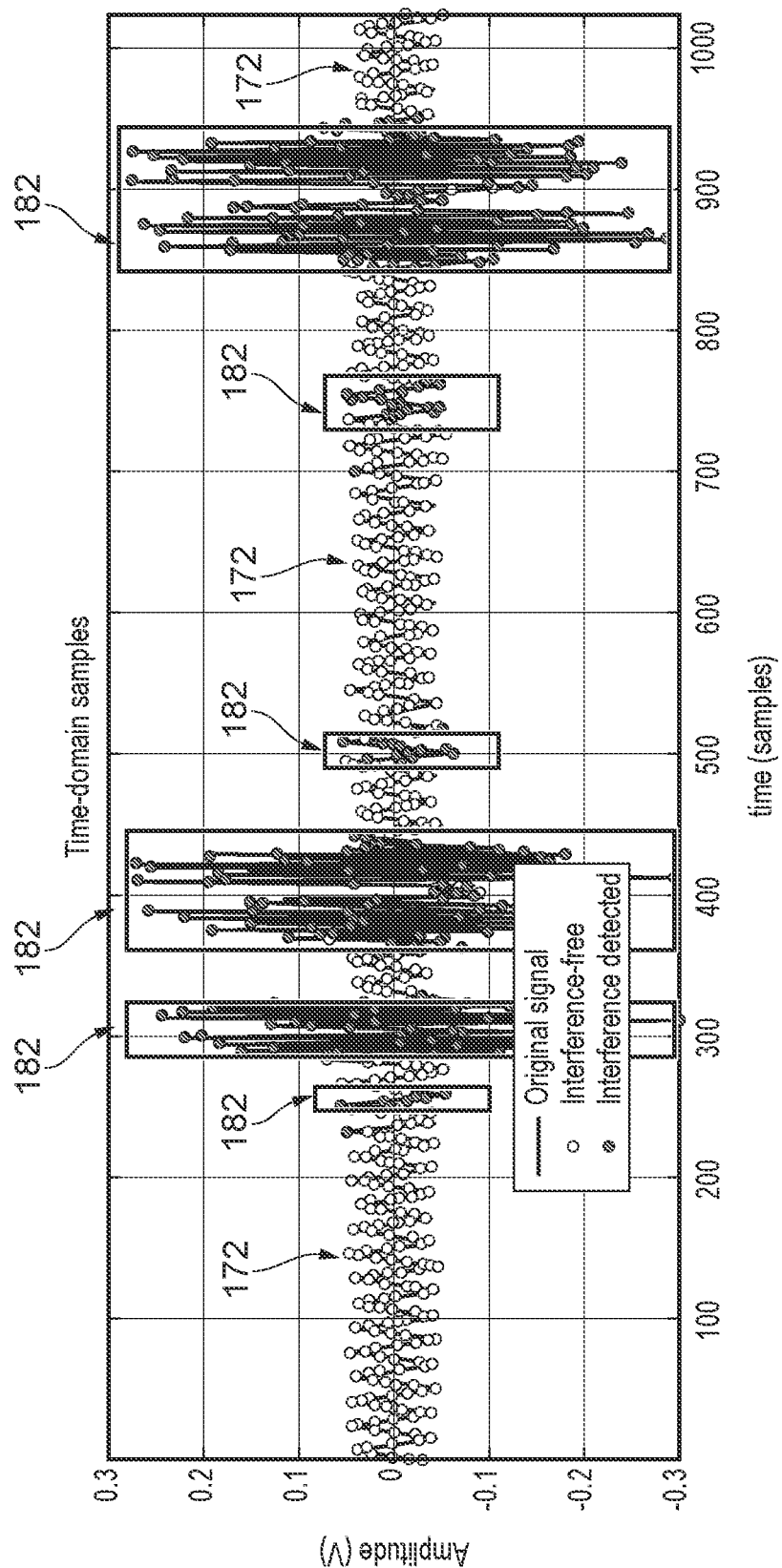
FIG. 19 is a plot showing the original beat signal of FIG. 16 with the combined mask applied.

Again, it is therefore advantageous to combine the first detection results (i.e., first mask, or |x| results) and the second detection results (i.e., the second mask, of |HPF(x)| results), to combine the advantages of improved low-frequency interference detection and improved low-magnitude (high-frequency) interference detection. This is shown in FIG. 19, which shows the combined detection outcome of the two-path process. In other words, FIG. 19 illustrates the combined mask applied to the original beat signal in FIGS. 15-18, wherein the combined mask is obtained by multiplying the first mask resulting from FIG. 16 by the second mask (for |HPF(x)|) resulting from FIG. 18.

In summary, the first mask generated using the modulus samples can be better at detecting low-frequency interference, as this low-frequency interference is usually suppressed by the high-pass filter used in the generation of the second mask. In addition, the second mask generated using the modulus of the high-pass filtered samples can be better at detecting lower magnitude high-frequency interference. Thus, the combined mask can provide improved interference detection compared to using a single mask. However, the single mask technique of the present disclosure can still be very effective and so the combined mask is not essential in all embodiments.

Following the generation of the mask, or combined mask, the data processing device may pass information regarding the samples identified as comprising interference to another component of the radar system 100. The radar system may carry out appropriate avoidance and/or mitigation strategies as are generally known in the art. For example, various radar operation parameters may be changed to try and reduce the interference in the next system cycle of chirps. Additionally or alternatively, some of the interference parameters (e.g. time duration, frequency, etc.) may be estimated to try and reduce the interferer components in the receive radar signals.

Figure 20:
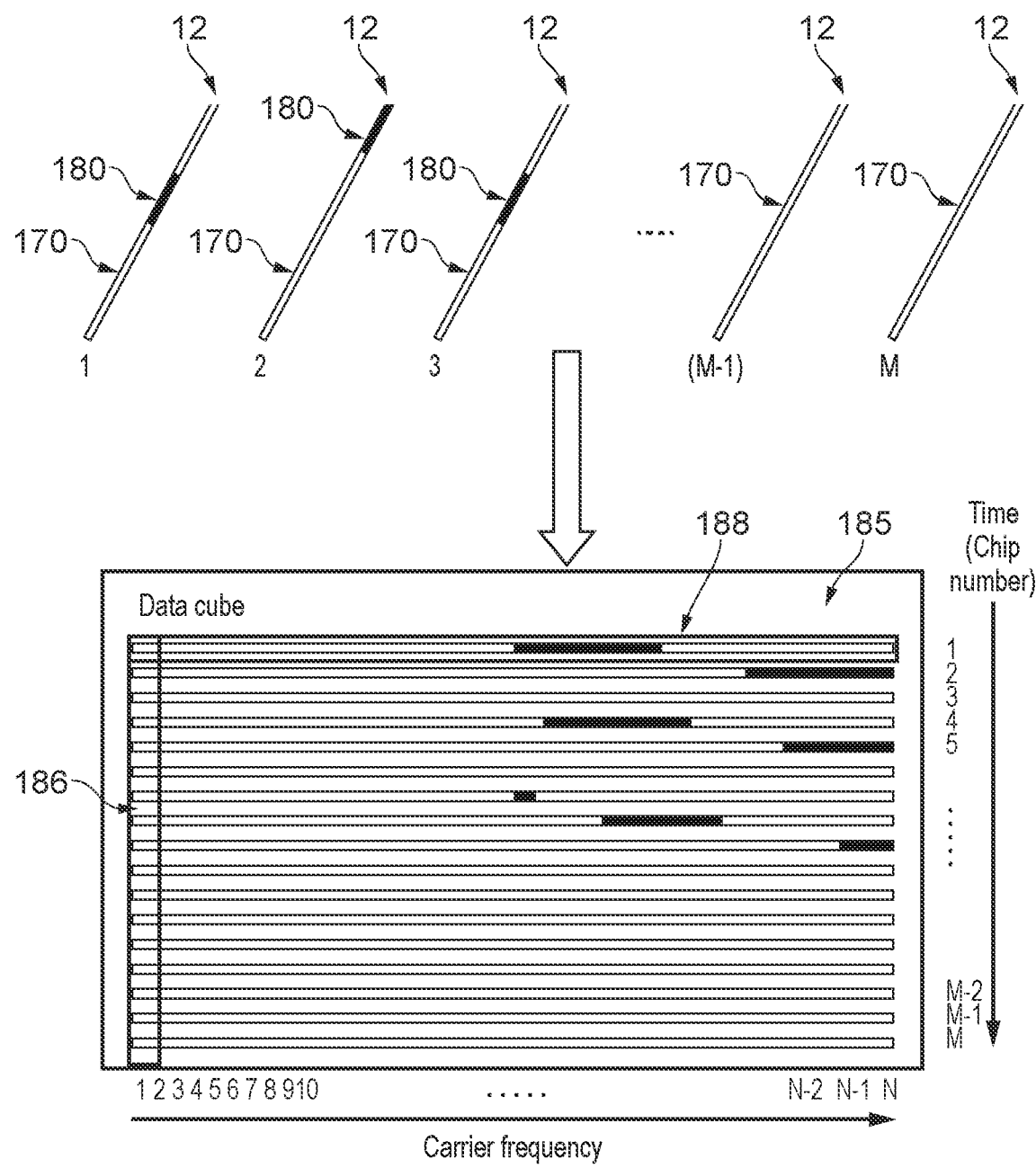
FIG. 20 is a diagram illustrating the aggregation of 2D masks, or combined masks, according to an embodiment of the present disclosure.

As mentioned above, the detection process can be repeated for a plurality of chirps or beat signals $x_m$, wherein m defines the chirp number. This is illustrated in FIG. 20, wherein the top of the diagram shows a plurality of received chirps 12, from the first chirp 12 in a cycle (m=1) to the final chirp m. The portions of the received chirp 12 that are detected to comprise interference, using the process described above, are darker grey and labelled as 180. The portions of the received chirp 12 that are detected to be interference-free are lighter grey and labelled as 170.

Each chirp 12 can be represented by a mask, or combined mask, as explained above. For example, a simplified vector representation of the mask for the $2^{nd}$ chirp in the carrier frequency dimension may be {1 1 1 . . . 0 0}, wherein 0 is the first value indicative of interference (e.g., region 180 at the highest frequency of the chirp) and 1 is the second value indicative of no interference (e.g., region 170 at the lower frequencies of the chirp). As shown in FIG. 20, the plurality of masks representing chirps 1 to m can be stored as two-dimensional (2-D) masks. In the accumulated 2-D masks the y-axis corresponds to the chirp number 1 to m which is representative of time (sometimes called slow time), as the $1^{st}$ chirp is received at the earliest time and the $m^{th}$ chirp is received at the latest time. The x-axis corresponds to the sample number 1 to N, which is indicative of the carrier frequency as the $1^{st}$ sample has the lowest carrier frequency and the $N^{th}$ sample has the highest carrier frequency.

Thus, each row in the 2-D accumulated mask corresponds to the mask of the Mth chirp, and each column corresponds to the Nth sample across the plurality of masks.

It will be appreciated that in the accumulated 2-D masks in FIG. 20 the light grey corresponds to the second mask value (which may be 1) and the dark grey corresponds to the first mask value (which may be 0).

The location of the first values in the accumulated 2-D mask (i.e. the locations of the detected interference) can provide valuable information that allows the radar system to adjust the time and/or frequency parameters of the next cycle of output chirps to avoid or minimise interference in the next frame. For example, as shown in FIG. 20 the interference is mainly location in the upper (higher) frequency of the chirps, as such this could potentially be mitigated by lowering the maximum frequency of the chirps to avoid the frequencies identified as comprising interference.

In some embodiments, the data processing device may be configured to determine if a total number of first values in a column or row of the 2-D mask exceeds a predetermined limit. If the predetermined limit is exceeded an interference flag may be set. This interference flag may be output to another component in the radar system and may trigger an appropriate avoidance and/or mitigation action.

However, the accumulated 2-D masks take up quite a lot of memory to store in the radar system. This can be problem for memory-constrained radar applications such as automotive radar. As such, to reduce the storage requirements the accumulated 2-D masks ($A_{2D}$) may be stored as two 1-D vectors, a frequency (or sample number) vector and a time (or chirp number) vector. Each variable (A) in the vectors corresponds to the aggregated number of first values (e.g. zeroes) in the frequency (sample number) dimension and the time (chirp number) dimension respectively, as shown below:

$$A_f[n] = \sum_{m=1}^{M} A_{2D}[m, n] \quad -(3)$$

-continued $$A_t[m] = \sum_{n=1}^{N} A_{2D}[m, n] \quad -(4)$$

Wherein N is the number of samples and the M is the number of chirps.

FIG. 20 illustrated how the mask values are aggregated to form the vectors, using the boxes 186, 188 shown on the 2-D mask. The first variable of the 1-D frequency vector is determined by adding up the total number of first values (e.g. zeroes) in the vertical box 186 at N=1. As shown in FIG. 20, the N=1 column of the 2-D mask does not comprise any first values, so the first vector variable would be 0. The first variable of the 1-D time vector is determined by adding up the total number of first values (e.g. zeroes) in the horizontal box 188, i.e., the first row M=1 of the 2-D mask. As shown in FIG. 20, the M=1 row of the 2-D mask does comprise some first values towards the centre of the mask. For example, if the first mask value=0 and the second mask value=1 and a simplified version of the M=1 row of the 2-D mask was {1 1 1 1 0 0 0 1 1 1 1} then the first variable of the 1-D time vector would be 3, as there are three zeroes present in the first row.

The data processing device may be configured to set an interference flag if a variable in either the 1D frequency vector or the 1-D time vector exceeds a predetermined limit. This interference flag (or interference avoidance flag) may be output to another component in the radar system and may trigger an appropriate avoidance and/or mitigation action.

Optionally, the 1-D time or frequency vector can be weighted by the applied slow-time or fast-time FFT window, to better determine how severe the interference effects are after range and Doppler processing.

Accordingly, there has been described a data processing device and method for detecting interference in FMCW radar signals, configured to use an adaptive thresholding technique to identify interference in a plurality of samples forming a beat signal, the adaptive thresholding including grouping the plurality of samples into a plurality of subsets, determining a maximum magnitude of each subset and extracting an nth lowest maximum magnitude of the plurality of subsets to determine an adaptive threshold, and applying the adaptive threshold to each sample to generate a mask. In some embodiments, a combined mask may be created by multiplying a first mask, determined using the modulus of the samples, by a second mask determined using high-pass filtered samples.

Although particular embodiments of this disclosure have been described, it will be appreciated that many modifications/additions and/or substitutions may be made within the scope of the claims.

The invention claimed is:

1. A data processing device for detecting interference in frequency modulated continuous wave, FMCW, radar signals received by a radar receiver of a radar system, wherein the data processing device is configured to:
obtain a plurality of samples forming a beat signal;
determine a magnitude of each sample;
group the plurality of samples into a plurality of subsets wherein each subset corresponds to a given time segment of the beat signal;
determine a maximum magnitude of each subset;
extract an $n^{th}$ lowest maximum magnitude of the plurality of subsets to determine an adaptive threshold;
apply the adaptive threshold to each sample of the plurality of samples to generate a mask, wherein if the magnitude of a sample is higher than the adaptive threshold the mask has a first value for that sample and if the magnitude of the sample is lower than the adaptive threshold the mask has a second value for that sample; and
apply the mask to the beat signal to remove any samples detected as comprising interference,
wherein the first value is indicative of a sample comprising interference and the second value is indicative of a sample without interference.

2. The data processing device of claim 1, further configured to multiply the extracted $n^{th}$ lowest maximum magnitude by an upscaling factor to determine the adaptive threshold.

3. The data processing device of claim 1, wherein the $n^{th}$ lowest maximum magnitude is the $3^{rd}$ lowest maximum magnitude, or the $2^{nd}$ lowest maximum magnitude, or the lowest maximum magnitude.

4. The data processing device of claim 1, wherein prior to determining the magnitude of each sample, the data processing device is configured to:
apply a high-pass filter to each sample of the plurality of samples.

5. The data processing device of claim 1, further configured to:
apply a moving average filter followed by a fixed threshold to the mask.

6. The data processing device of claim 1, wherein the plurality of subsets is a first plurality of subsets, the adaptive threshold is a first adaptive threshold and the mask is a first mask, and the data processing device is further configured to:
apply a high-pass filter to each sample of the plurality of samples;
determine the modulus of each high-pass filtered sample to produce a plurality of modulus high-pass filtered beat samples;
group the plurality of modulus high-pass filtered beat samples into a second plurality of subsets, wherein each subset of the second plurality of subsets corresponds to a given time segment of the modulus of the high-pass filtered beat signal;
determine a maximum magnitude of each subset of the second plurality of subsets;
extract an $n^{th}$ lowest maximum magnitude of the second plurality of subsets to determine a second adaptive threshold;
apply the second adaptive threshold to each modulus high-pass filtered beat sample of the plurality of modulus high-pass filtered beat samples to generate a second mask, wherein if the magnitude of a sample is higher than the second adaptive threshold the second mask has a first value for that sample and if the magnitude of the sample is lower than the second adaptive threshold the second mask has a second value for that portion; and
multiply the first mask and the second mask together to generate a combined mask.

7. The data processing device of claim 6, further configured to:
apply a moving average filter followed by a fixed threshold to at least one of the first mask and the second mask.

8. The data processing device of claim 1, further configured to:
determine the number of first values in the mask; and
in response to determining that the number of first values exceeds a predetermined limit, set an interference flag.

9. The data processing device of claim 1, further configured to:
generate a plurality of masks or a plurality of combined masks, each mask or combined mask associated with a respective beat signal; and
aggregate the plurality of masks or the plurality of combined masks to form a first one-dimensional vector and a second one-dimensional vector,
wherein each variable in the first one-dimensional vector is a summation of the number of first values in the plurality of masks or the plurality of combined masks in the time dimension, and
wherein each variable in the second one-dimensional vector is a summation of the number of first values in the plurality of masks or the plurality of combined masks in the frequency dimension.

10. The data processing device of claim 9, further configured to:
set an interference flag if a variable in either the first one-dimensional vector or the second one-dimensional vector exceeds a predetermined limit.

11. A package including an integrated circuit, wherein the integrated circuit is configured to provide the data processing device of claim 1.

12. A frequency modulated continuous wave, FMCW, radar system including the data processing device of claim 1.

13. A method of detecting interference in a frequency modulated continuous wave, FMCW, radar system, the method comprising:
obtaining a plurality of samples forming a beat signal;
determining a magnitude of each sample;
grouping the plurality of samples into a plurality of subsets, wherein each subset corresponds to a given time segment of the beat signal;
determining a maximum magnitude of each subset;
extracting an $n^{th}$ lowest maximum magnitude of the plurality of subsets to determine an adaptive threshold;
applying the adaptive threshold to each sample of the plurality of samples to generate a mask, wherein if the magnitude of a sample is higher than the adaptive threshold the mask has a first value for that sample and if the magnitude of the sample is lower than the adaptive threshold the mask has a second value for that sample; and
further comprising applying the mask to the beat signal to remove any samples detected as comprising interference,
wherein the first value is indicative of a sample comprising interference and the second value is indicative of a sample without interference.

14. The method of claim 13, wherein the plurality of subsets is a first plurality of subsets, the adaptive threshold is a first adaptive threshold and the mask is a first mask, and the method further comprises:
applying a high-pass filter to each sample of the plurality of samples;
determining the modulus of each high-pass filtered sample to produce a plurality of modulus high-pass filtered beat samples;
grouping the plurality of modulus high-pass filtered beat samples into a second plurality of subsets, wherein each subset of the second plurality of subsets corresponds to a given time segment of the modulus of the high-pass filtered beat signal;
determining a maximum magnitude of each subset of the second plurality of subsets;
extracting an nth lowest maximum magnitude of the second plurality of subsets to determine a second adaptive threshold;
applying the second adaptive threshold to each modulus high-pass filtered beat sample of the plurality of modulus high-pass filtered beat samples to generate a second mask, wherein if the magnitude of a sample is higher than the second adaptive threshold the second mask has a first value for that sample and if the magnitude of the sample is lower than the second adaptive threshold the second mask has a second value for that portion; and
multiplying the first mask and the second mask together to generate a combined mask.

15. The method of claim 14, further comprising applying a moving average filter followed by a fixed threshold to at least one of the first mask and the second mask.

16. The method of claim 13, further comprising multiplying the extracted $n^{th}$ lowest maximum magnitude by an upscaling factor to determine the adaptive threshold.

17. The method of claim 13, wherein the $n^{th}$ lowest maximum magnitude is the $3^{rd}$ lowest maximum magnitude, or the $2^{nd}$ lowest maximum magnitude, or the lowest maximum magnitude.

18. The method of claim 13, further comprising:
prior to determining the magnitude of each sample, applying a high-pass filter to each sample of the plurality of samples.

19. A data processing device for detecting interference in frequency modulated continuous wave, FMCW, radar signals received by a radar receiver of a radar system, wherein the data processing device is configured to:
obtain a plurality of samples forming a beat signal;
determine a magnitude of each sample;
group the plurality of samples into a plurality of subsets wherein each subset corresponds to a given time segment of the beat signal;
determine a maximum magnitude of each subset;
extract an $n^{th}$ lowest maximum magnitude of the plurality of subsets to determine an adaptive threshold;
apply the adaptive threshold to each sample of the plurality of samples to generate a mask, wherein if the magnitude of a sample is higher than the adaptive threshold the mask has a first value for that sample and if the magnitude of the sample is lower than the adaptive threshold the mask has a second value for that sample; and
determine the number of first values in the mask; and
in response to determining that the number of first values exceeds a predetermined limit, set an interference flag,
wherein the first value is indicative of a sample comprising interference and the second value is indicative of a sample without interference.

* * * * *